United States Patent
Joseph et al.

(10) Patent No.: US 6,938,000 B2
(45) Date of Patent: Aug. 30, 2005

(54) AUTOMATED CUSTOMER SUPPORT SYSTEM

(75) Inventors: Sindhu Joseph, Kerala State (IN); Ravindra K. Shetty, Bangalore (IN); Venkatesan Thyagarajan, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 821 days.

(21) Appl. No.: 09/852,881

(22) Filed: May 10, 2001

(65) Prior Publication Data

US 2003/0028448 A1 Feb. 6, 2003

(51) Int. Cl.⁷ ............................................. G06F 17/60
(52) U.S. Cl. ............................... 705/26; 707/3; 707/1; 707/104; 382/306
(58) Field of Search ............................... 705/26, 27, 3, 705/4, 5; 707/1, 3, 104.1; 382/306; 706/55; 708/315

(56) References Cited

U.S. PATENT DOCUMENTS

| | | | |
|---|---|---|---|
| 4,862,402 A | * 8/1989 | Shah et al. | ................... 708/315 |
| 5,678,002 A | 10/1997 | Fawcett et al. | ......... 395/183.01 |

(Continued)

FOREIGN PATENT DOCUMENTS

| | | | | |
|---|---|---|---|---|
| CA | 2253145 A1 | * | 4/1999 | ............. G01J/3/02 |
| WO | WO 99/21348 | * | 4/1999 | ............ H04M/3/42 |

OTHER PUBLICATIONS

Press release, "Marthastewart.com Content Archives Now Accessible Through Online Search Powered by Goggle", Business Editors/Technology writers; Business Wire; New York; Mar. 27, 2001 extracted on Internet from Proquest database on Jan. 5, 2005.*

Kobayashi, M and Takeda, K; "Information Retrieval on the Web"; IBM Research; ACM Computing Surveys; vol.32, No.2; Jun. 2000 extracted on Internet from Proquest database on Jan. 5, 2005.*

Press release, "AI Makes Mark in Corporate World"; Computerworld; May 18, 1992, vol.26, Iss 20, pg.87 , 2 pgs; extracted from proquest database on Internet on Jul. 11, 2004.*

*Primary Examiner*—Yogesh Garg
(74) *Attorney, Agent, or Firm*—Schwegman, Lundberg Wossner & Kluth

(57) ABSTRACT

An automated customer support tool. A web server receives one or more queries regarding the product from a customer. A categorizer coupled to the web server categorizes the received queries based on a type of query, to determine whether the answers to the queries can be automatically communicated to the customer. An FAQ extractor extracts one or more corresponding product FAQs from respective product FAQ data bases. A key-word extractor extracts one or more key-words from the received queries and the extracted product FAQs. The key-word extractor further transforms the extracted key words to unique numerical representations. An analyzer coupled to the key-word extractor represents the transformed key-words into respective query and product FAQ vector forms. The analyzer further applies a convolution algorithm to each of the query vector forms, with each of the product FAQ vector forms separately and obtains one or more appropriate answers to the queries. Then the analyzer automatically communicates the answers to the queries received from the customer.

36 Claims, 2 Drawing Sheets

U.S. PATENT DOCUMENTS

| | | | |
|---|---|---|---|
| 5,899,999 A * | 5/1999 | De Bonet | 707/104.1 |
| 6,145,096 A | 11/2000 | Bereiter et al. | 714/25 |
| 6,236,768 B1 * | 5/2001 | Rhodes et al. | 382/306 |
| 6,240,420 B1 | 5/2001 | Lee | 707/102 |
| 6,347,315 B1 * | 2/2002 | Kiyoki et al. | 707/5 |
| 6,493,711 B1 * | 12/2002 | Jeffrey | 707/5 |
| 6,560,590 B1 * | 5/2003 | Shwe et al. | 706/55 |
| 6,587,848 B1 * | 7/2003 | Aggarwal et al. | 707/3 |
| 6,598,047 B1 * | 7/2003 | Russell et al. | 707/5 |
| 6,654,740 B2 * | 11/2003 | Tokuda et al. | 707/5 |
| 2002/0002550 A1 * | 1/2002 | Berman | 707/3 |
| 2002/0055916 A1 * | 5/2002 | Jost et al. | 707/1 |
| 2002/0156760 A1 * | 10/2002 | Lawrence et al. | 707/1 |

* cited by examiner

AUTOMATED CUSTOMER SUPPORT SYSTEM

FIELD OF THE INVENTION

This invention relates generally to the field of automated customer support systems, and more particularly pertains to an automated customer support system using intelligent information mining techniques.

BACKGROUND

Support of products is generally a very expensive and time-consuming process. When customers experience problems with a product, the customers typically contact product support for assistance. In such scenarios, efficient query handling and response is essential to provide a quick response that is expected by the customers. Currently such product support services are highly labor-intensive and time-consuming because such customer support services are generally handled by trained personnel who receive the queries from the customers, have to understand the queries, search the product databases, and manually answer the customer's queries. This manual customer support service process can result in wasting human expertise for trivial tasks, which in turn can result in delayed response to the customers and increased cost to a provider of customer support services.

Generally, most of the queries received from customers tend to be repetitious and similar in fundamental characteristics. Such queries can be classified and responded to instantaneously through an automated system. The process becomes more complex when a company has a range of products and a huge customer base having product related problems that has diverse solutions. The process can get even more complex when the media through which the customers interact with customer support services is diverse, i.e., e-mail, internet, telephone, and letter. Further, the process can become even more complex when response to a query depends on the type of product, the attitude of the customer, and status of the client.

Current processes using automated customer support systems are mostly characterized by huge databases of domain specific keywords, built into the system, using search methods adopted to answer queries specifically through e-mails, and there has been very little effort to build an integrated system to account for various products, customer bases, diverse customer interactions, and the nature of the queries.

Therefore, there is a need in the art for an automated customer support system that can take into account various products, various customer bases, diverse customer interactions, and nature of the queries and respond automatically to customer queries at a low cost as expected by customers.

SUMMARY OF THE INVENTION

The present invention provides a system and a method for providing an automated customer support for a product that includes a web server to receive one or more queries regarding the product from a customer. A FAQ (Frequently Asked Question) extractor coupled to the web server extracts one or more corresponding product FAQs from respective product FAQ databases. A key-word extractor coupled to the web server and FAQ extractor extracts one or more key words from the received queries and the extracted product FAQ's (Frequently Asked Questions). The key-word extractor further transforms the extracted key-words to unique numerical representations so that the transformed unique numerical representations do not result in multiple similar numerical representations, to avoid ambiguous prediction of meaning from the transformed unique numerical representations. An analyzer coupled to the key-word extractor represents the transformed words into respective query and product FAQ vector forms. The analyzer further applies a convolution algorithm to each of the query vector forms, with each of the product FAQ vector forms separately and obtains one or more appropriate answers to the queries. Then the analyzer automatically communicates the answers to the customer.

Other aspects of the invention will be apparent on reading the following detailed description of the invention and viewing the drawings that form a part thereof.

DETAILED DESCRIPTION

This invention offers an intelligent information mining technique to automatically respond to received customer queries regarding a product. The technique takes into account the nature of the queries including parameters such as product category, mindset of the customer/client, topic, type of customer/client, nature of query and other such information helpful in categorizing the received queries and automatically responding to the customer's queries and providing the answers to the customer.

Figure 1:
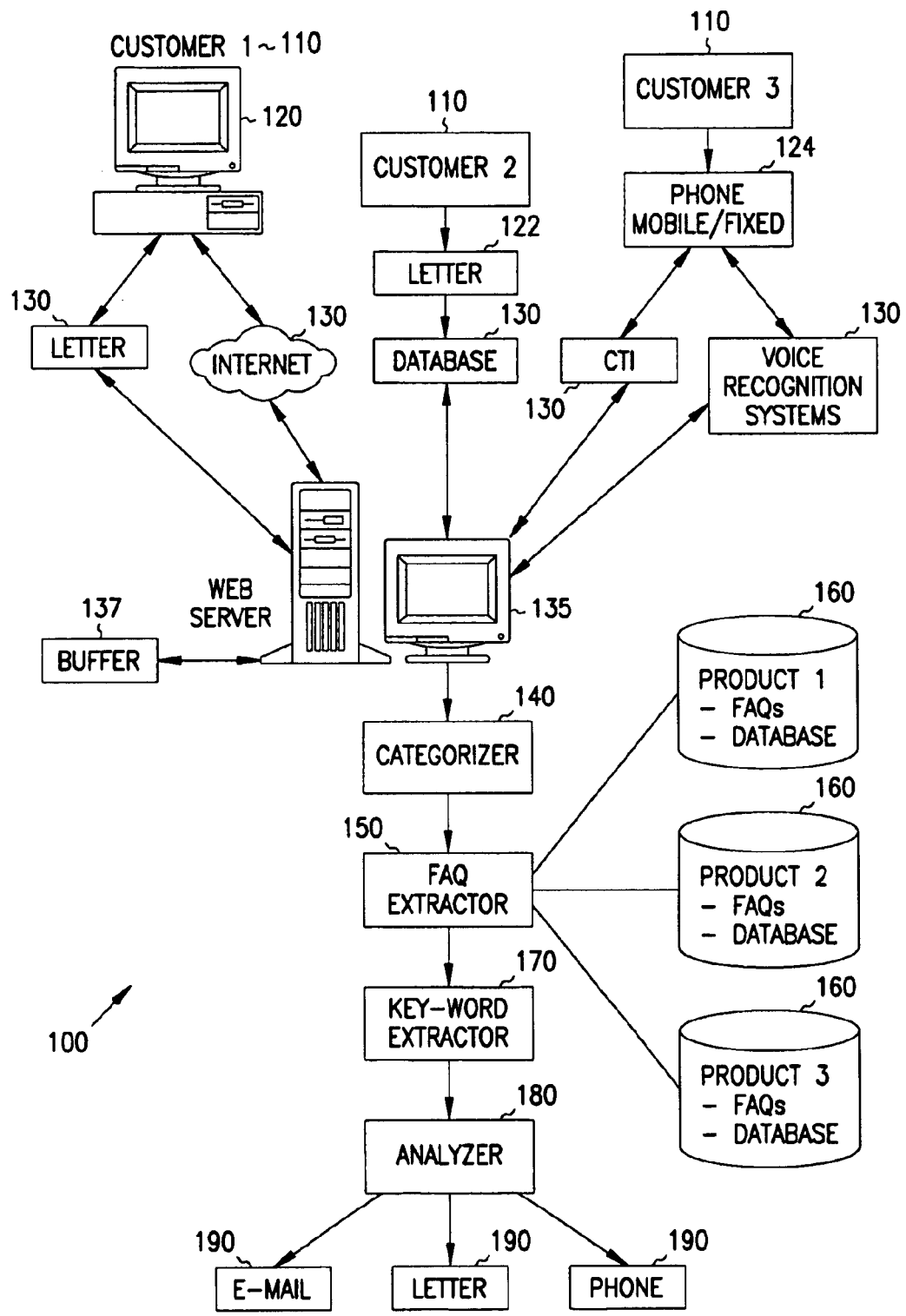
FIG. 1 illustrates an overview of one embodiment of a computer implemented system according to the present invention.

FIG. 1 illustrates an overview of one embodiment of a computer-implemented system 100 according to the present invention. A web server 135 is connected to receive one or more queries regarding a product from a customer from various sources 130. For example, the web server 135 can receive queries from sources such as e-mail, Internet, a data base/data warehouse, Computer telephony interface (CTI), and/or voice recognition systems. The computer-implemented system 100 allows customers 110 to send queries via the various sources 130 via their computers 120, via a letter 122, and/or via telephone 124. In some embodiments, the web server 135 translates the received queries into a text in a natural language. The web server 135 can receive the queries in the letter 122 through a manual entry process. The web server 135 can also translate the received queries through the telephones into text form using a voice recognition system. In some embodiments, the web server 135 can store the received queries in a buffer 137. The system 100 can receive queries can be regarding a product or a service.

The computer-implemented system 100 can include a categorizer 140. The categorizer 140 is connected to the web server 135 and categorizes the received queries based on a type of query. The categorizer 140 categorizes based on categories such as product category, mindset of the customer, topic, type of customer, nature of query, and/or other such categories that can assist in categorizing the email to automatically communicate the answers to the customer's queries. The following example illustrates one example embodiment of categorizing the received query by the categorizer 140:

"I want to comment on your product<XYZ>as I have never seen such a<, worse or more useless>software. All the features should be available very easily and you have made it complicated. I<, regret>having<, invested>in such a<lousy>product."

The categorizer 140 can categorize the above query as follows:
Product
Mind-set of the customer
❸ Topic
❹ Request
Status of the customer.

The computer-implemented system 100 includes a FAQ extractor 150. The FAQ extractor 150 is connected to the categorizer 140 and the web server 135 and extracts one or more corresponding product FAQs from respective product FAQ databases 160.

The following illustrates one example of answers to product FAQs that the FAQ extractor can extract from the product FAQ databases for the above-illustrated customer query:

"1) To check whether the keyboard got stuck, check whether Num Lock and Caps Lock change their state. If not then the keyboard is hung."

"2) Menus don't work properly when used with keyboard because Num Lock may be on. Try turning Num Lock off."

In some embodiments, the computer-implemented system 100 manually responds to the received customer's query based on the outcome of the categorization. For example, the categorization can yield a mind-set, a product, and/or status (based on customer's investment in the product) where a manual response may be warranted. In such situations, the computer-implemented system signals a manual response to the customer's queries. In the above-illustrated example, the customer's mind-set is negative, and the computer-implemented system can be programmed to respond manually.

The computer-implemented system 100 includes a key-word extractor 170. The key-word extractor 170 is connected to the web server 135 and the FAQ-extractor 150. The key-word extractor 170 extracts one or more key-words from the received queries and the extracted product FAQs. In some embodiments, the key-word extractor 170 extracts one or more key-words from the received queries and extracted product FAQs based on specific criteria, such as removing one or more general words (such as, check, what, whether, their, then, when, with, because etc.,) removing all words including three or fewer letters (such as to, the, and, it, is, not, now, can, you, to, do, off, may, be, on, etc.,), and/or removing one or more rarely used words. In some embodiments, the system 100 can include a key-phrase extractor to extract one or more key-phrases.

In some embodiments, the key-word extractor 170 replaces the extracted key-words with appropriate synonyms, and further stems the replaced key-words using a Modified Porters Stemming Algorithm.

The following examples illustrate the process of replacing extracted key-words with synonyms:
   computer←Machine
   computer←System The following examples illustrate the process of stemming using the Modified Porters Stemming Algorithm:
   Change→chang
   Menus→menu
   Properly→prop In some embodiments, the key-word extractor applies the Modified Porters Stemming Algorithm to each of the replaced words until no more stemming can be performed (iterative stemming) on the replaced key-word. This is illustrated in the following examples:
   Competitiveness→competitive→compete
   Repeatedly→repeated→repeat Further, the key-word extractor 170 transforms each of the extracted key-words into a unique numerical representation so that the transformed unique numerical representations do not result in multiple similar numerical representations, to avoid ambiguous prediction of meaning from the transformed unique numerical representations. The key-word extractor 170 uses a unique text-to-number converter algorithm to transform the extracted key words into unique numerical representations. The following example illustrates the transformed unique numerical representations:

| Key-Words | Unique numerical representations |
|---|---|
| KEYBOARD | 197374 |
| STUCK | 347959 |
| NUMLOCK | 260616 |
| CAPSLOCK | 53845 |
| CHANG | 58182 |
| STATE | 47516 |
| HUNG | 155181 |
| TELL | 355230 |
| WORK | 414873 |

The key-word extractor 170 normalizes each of the transformed unique numerical representations. In some embodiments, the key word extractor 170 normalizes the transformed unique numerical representations based on minimum/maximum values in the transformed unique numerical representations. The following algorithm illustrates the process of normalizing using the minimum/maximum values:

When there are n answers $(A_1, A_2, \ldots A_n)$ in a product FAQ data base and each answer has few key-words, and the query be Z $$A_i = \{x_{i1}, x_{i2}, \ldots, x_{ik}\}$$

Normalize the values max=max $(x_{ij}, z_j)$ $x_{ij} \leftarrow x_{ij}/\text{max}$ $z_j \leftarrow z_j/\text{max}$ Where, $x_{ij}$=the jth keyword extracted from the $i^{th}$ answer in the product FAQ.

$z_j$=jth keyword of the email query.

The following example illustrates the process of normalizing for the example illustrated above using the above-illustrated algorithm:

max=max $(x_{ij}, z_j)$
max={KEYBOARD(197374)
STUCK(347959),
WORK(414873),
TELL(355230) . . .}
Normalized values for the above examples are:

| | |
|---|---|
| KEYBOARD | 0.473517 |
| STUCK | 0.834782 |
| WORK | 0.995315 |
| TELL | 0.852226 |

An analyzer 180 coupled to the key-word extractor 170 represents the normalized values into respective query and product FAQ vector forms. In some embodiments, the analyzer 180 forms the vectors based on a predetermined number of key-words. The predetermined number is generally in the range of about 10–15 key-words (normalized Values) for any given query and answers to product FAQs.

The analyzer 180 forms vectors as follows:

<$X_{i1}, X_{i2}, \ldots, X_{in}$> where $X_{ij}$ represents the j th keyword in the i th FAQ.

Assuming k as the maximum number (predetermined number) of keywords extracted for any answer/query email.

The email query/answer with keywords<k, appends 0's in the rest of the positions.

The following illustrates the formation of query and product FAQ vector forms using 10 key-words (normalized values) for the above-illustrated example:

Query Vector Form for the received query from the customer:

<0.473517 0.834782 0.995315 0.852226 0.000000 0.000000 0.000000 0.000000 0.000000 0.000000>

Product FAQ vector forms for extracted answers from product FAQ:

1)<0.473517 0.834782 0.625239 0.129179 0.139583 0.833720 0.372292 0.000000 0.000000 0.000000>

2)<0.557209 0.193915 0.995315 0.704841 0.916632 0.473517 0.092645 0.625239 0.878554 0.530550>

The analyzer 180 applies a convolution algorithm to each of the query vector forms, with each of the product FAQ vector forms separately and obtains one or more appropriate answers to the queries received from the customer. The convolution algorithm is based on a moving weighted average with time domain representation of the key-words flipped back. The convolution technique involves matching the customer's queries to the answers in the product FAQs to pick the most relevant answers to the queries. The convolution algorithm used by the analyzer 180 to obtain the answers to the customer's queries is as follows:

$$y[m] = \sum_{k=0}^{m} x[k] * h[m-k]$$

Where m varies from 0 to 2n-1 y[m]—the convoluted time domain representation of the keyword x[k]—the original time domain representation of the keyword h[m-k]—flipped and shifted time domain representation of the keyword In some embodiments, the analyzer 180 applies self-convolution algorithm to each of the query vector forms to obtain resultant convoluted representation of the query. The self-convolution algorithm used by the analyzer 180 is as follows:

$$Z[m] = \sum_{k=0}^{m} x[k] * x[m-k]$$

Where m varies from 0 to 2n-1

Z[m]—the self-convoluted vector for the e-mail query x[k]—the original vector corresponding to the query x[m-k]—the flipped vector The following example illustrates the application of the above self-convolution algorithm tot he above-illustrated query vector form:

x[k]=<0.473517 0.834782 0.995315 0.852226 0.000000 0.000000 0.000000 0.000000 0.000000 0.000000>

$$Z[0] = \sum_{k=0}^{0} x[k] * x[0-k] = x[0]*x[0] \qquad = 0.473517*0.473517 \qquad = 0.224218$$

$$Z[1] = \sum_{k=0}^{1} x[k] * x[1-k] = x[0]*x[1]+x[1]*x[0] \qquad = 0.473517*0.834782+0.834782*0.473517 \qquad = 0.790567$$

$$Z[2] = \sum_{k=0}^{2} x[k] * x[2-k] = x[0]*x[2]+x[1]*x[1]+x[2]*x[0]$$

$$= 0.473517*0.995315+0.834782*0.834782+0.995315*0.473517 \qquad = 1.639458$$

$$Z[6] = \sum_{k=0}^{6} x[k] * x[7-k] = x[0]*x[6]+x[1]*x[5]+x[2]*x[4]+x[3]*x[3]+x[4]*x[2]+x[5]*x[1]+x[6]*x[0]$$

$$= 0.473517*0+0.834782*0+\ldots+0*0.473517 \qquad = 0.726289$$

Similarly, application of the above algorithm to Z[7], Z[8], . . . Z[19] yields 0.000000.

Based on the above illustrated self-convolution computation, the algorithm yields the following resultant convoluted representation of the query:

0.224218 0.790567 1.639458 2.468829 2.413498 1.696467 0.726289 0.000000 0.000000 0.000000 0.000000 0.000000 0.000000 0.000000 0.000000 0.000000 0.000000 0.000000 0.0000000

Further, the analyzer 180 applies the convolution algorithm to the query vector form, with each of the product FAQ vector forms separately to obtain resultant convoluted representation of the answer using the following convolution algorithm:

$$y_i[m] = \sum_{k=0}^{m} x[k] * h[m-k]$$

Where m varies from 0 to 2n-1

$y_i$[m]—the convoluted time domain representation for $i^{th}$ answer vector.

x[k]—the original time domain representation corresponding to the email query vector.

h[m-k]—flipped time domain representation corresponding to the answer vector in the product FAQ.

The following are the resultant convoluted representation of the FAQ answers obtained by using the above convolution algorithm to the above-illustrated two product FAQ vector forms:

0.224218 0.790567 1.464221 1.817521 1.507664 1.172721 1.12128 1.259553 1.081066 0.317277 0.000000 0.000000 0.000000 0.000000 0.000000 0.000000 0.000000 0.000000 0.000000

0.27171 0.750754 1.16439 1.653343 1.893364 2.197632.288878 1.553774 0.600691 0.000000 0.000000 0.000000 0.000000 0.000000 0.000000 0.000000 0.000000 0.000000

Then the analyzer 180 compares the above resultant convoluted representation of the query and the FAQ answers, to determine one or more appropriate answers to the queries. In some embodiments, the analyzer 180 compares each of the resultant convoluted representation of the query with each of the resultant convoluted representation of the FAQ answer to find the answers to the customer's queries. The analyzer uses the following algorithm to find the relevant answers:

If $y_i[j] - z[j] = 0$ then count$[i]$=count$[i]$+1; $j=0$ to 2n-1, $i=0$ to n-1

In some embodiments, the matching of the resultant convoluted representations is accomplished by using the following algorithm:

$$\text{Error}(i) = \sum_{j=0}^{2n-1} \sqrt{((y_i[j] - z[j]) * (y_i[j] - z[j]))}$$

Min error = min (Error($i$)) $\forall i = 0$ to $n - 1$

Minimum error among the sum of difference between the resultant convoluted representation of the query and the FAQ's, computed at each of the peaks can be the answer for the customer's query.

The analyzer 180 automatically communicates the answers to the customer's queries using various communicating methods 190. For example, the analyzer 180 can automatically communicate the answers using communicating methods, such as e-mails, telephones, and/or letters. The analyzer 180 can use text to voice/speech conversion for phone communications, and text to manual mail conversion for sending letters to the customers.

Figure 2:
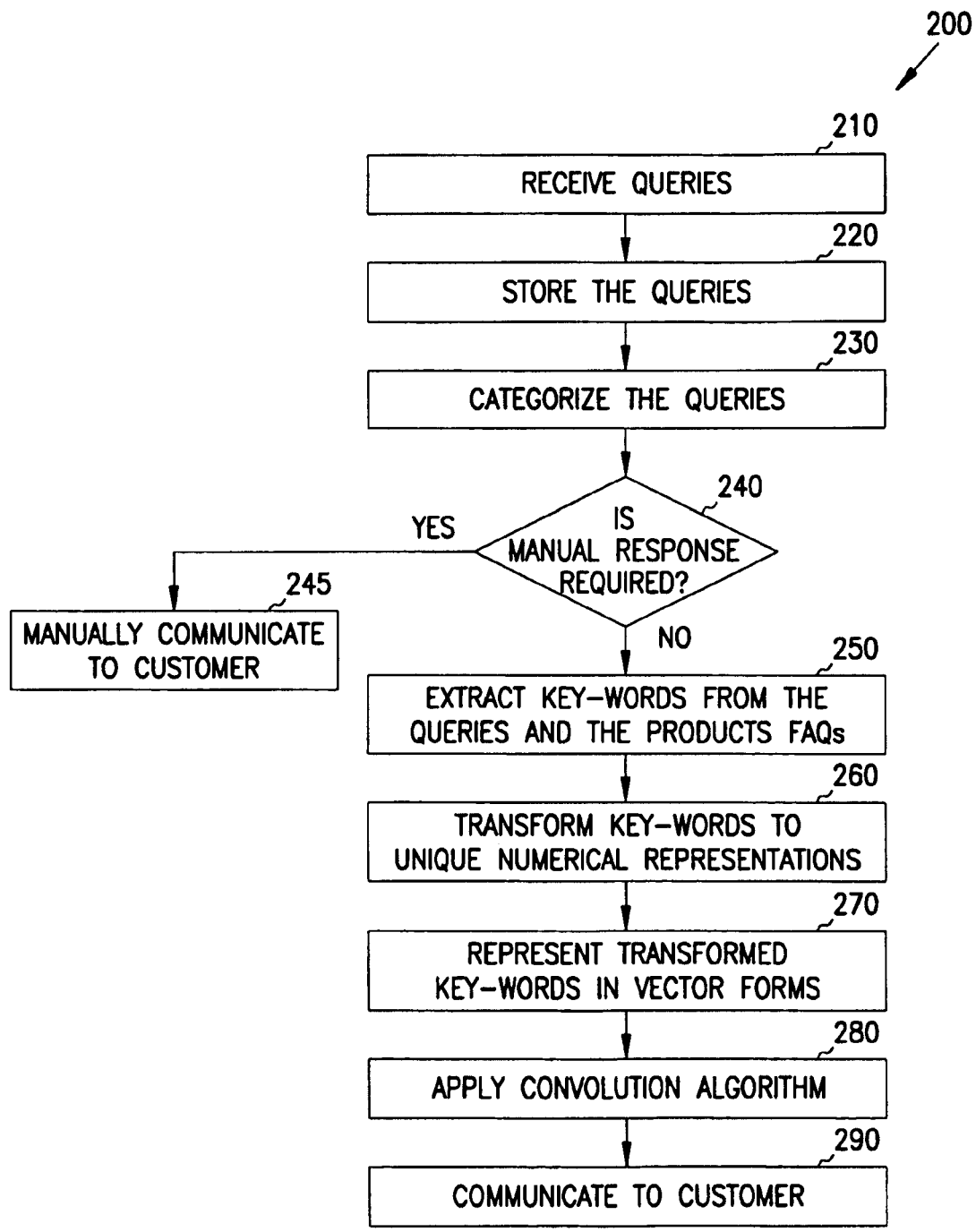
FIG. 2 illustrates overall operation of the embodiment shown in FIG. 1.

FIG. 2 illustrates an overview of one embodiment of the process 200 of the present invention. This process 200 provides, as illustrated in element 210, a computer-implemented system including a web server. The web server receives one or more queries regarding a product from a customer. Some embodiments allow the web server to receive queries related to multiple products and/or services from the customer. The web server can receive the queries from the customer from various sources such as a letter, a telephone, e-mail and Internet. Some embodiments allow the text to be translated to any natural language.

Element 220 includes storing the received queries. Some embodiments allow the text in a received letter to be manually entered into a buffer. Some embodiments allow the queries received from a fixed/mobile telephone to be converted into text using a voice recognition system and further store the converted text in the buffer.

Element 230 includes categorizing the received/stored queries based on a type of query. Categorizing the queries based on a type of query can include categorizing based on various categories such as product, mindset of customer, topic of the query, type of customer, nature of query, and/or other such categories that can assist in categorizing the received queries.

Element 240 requires checking the received queries to see whether they require a manual response. This can be based on the outcome of the categorization of the received queries. For example, if the customer query suggests an angered customer or the customer is a highly valued customer to the business, then the system can request a manual response as indicated in Element 245 to the customer to satisfy the customer's needs in these special situations.

Element 250 includes one or more answers from product FAQ's related to the received queries from a product FAQ database. Further, element 250 includes extracting query and FAQ key words from the received queries and extracted answers, respectively. Some embodiments allow extracting key words based on specific criteria such as removing one or more general words from the queries and product FAQs, removing all words including three or fewer letters, and removing one or more rarely used words. Some embodiments allow the extracted key words to be replaced by appropriate synonyms. Further, some embodiments allow stemming the replaced key words using a Modified Porters Stemming Algorithm. In some embodiments, the Modified Porters Stemming Algorithm is applied to the stemmed words until no more stemming can be performed. The process of stemming is described in detail with reference to FIG. 1.

Element 260 includes transforming each of the extracted query and FAQ key words into unique numerical representations such that the transformed unique numerical representation does not result in multiple similar numerical representations, to avoid ambiguous prediction of meaning of the translated words in the received queries and extracted answers. In some embodiments, the transformed key words (unique numerical representations) are normalized. Some embodiments allow normalizing based on minimum/maximum values in the transformed unique numerical representations. The process of normalizing is described in detail with reference to FIG. 1.

Element 270 includes representing the transformed query and FAQ key words in query and product FAQ vector forms, respectively. The process of representing the vector forms is discussed in more detail with reference to FIG. 1. Some embodiments allow representing the vector forms using the normalized unique numerical representations. In some embodiments, the size of the vector forms is based on a predetermined number of transformed key words. The size of the predetermined number of key words can be in the range of about 10 to 15 key words.

Element 280 includes applying a convolution algorithm to each of the query vector forms, with each of the product FAQ vector forms separately and obtains one or more appropriate answers to the customer's queries. In some embodiments, Element 280 includes applying a self-convolution algorithm to each of the query vector forms to obtain resultant convoluted representation of the query. In addition, Element 280 can also include applying the convolution algorithm to the query vector form with each of the product FAQ vector forms to obtain resultant convoluted representation of the FAQ answers. Further, Element 280 includes comparing the resultant convoluted representation of the query and the FAQ answers to determine appropriate answers to the queries. The process of applying convolution and self-convolution algorithms is described in detail with reference to FIG. 1.

Element 290 includes automatically communicating the answers to the queries received from the customer. Some embodiments allow the answers to be communicated to the customers using communication methods such as a letter, an email, Internet and a telephone.

The above description is intended to be illustrative, and not restrictive. Many other embodiments will be apparent to those skilled in the art. The scope of the invention should therefore be determined by the appended claims, along with the full scope of equivalents to which such claims are entitled.

What is claimed is:

1. A method A computer implemented method for providing customer support for a product, comprising:

a server receiving one or more queries regarding a product from a customer;

extracting one or more query key words from each of the queries;

extracting one or more answers from product FAQ's related to the received queries from a product FAQ database;

extracting one or more FAQ key words from the extracted answers;

transforming the extracted query and FAQ key-words into unique numerical representations such that the transformed unique numerical representations do not result in multiple similar numerical representations, to avoid ambiguous prediction of meaning of the translated words in the received queries and extracted answers;

representing the transformed query and FAQ key-words into query vector forms and product FAQ vector forms, respectively;

applying a convolution algorithm to each of the query vector forms, with each of the product FAQ vector forms separately and obtains one or more appropriate answers to the queries; and automatically communicating the appropriate answers to the queries received from the customer.

2. The method of claim 1, wherein the product comprises:
a product selected from the group consisting of multiple products and multiple services.

3. The method of claim 1, further comprising:
receiving queries from the customer through inputs selected from the group consisting of a letter, a telephone, an e-mail and Internet; and
translating the received queries into a text.

4. The method of claim 3, wherein translating the received queries through a letter comprises:
manually entering the text in the received queries into a buffer.

5. The method of claim 3, wherein translating the received queries through a telephone comprises:
converting the received queries into a text using a voice recognition system.

6. The method of claim 3, further comprising:
storing the translated queries into a buffer;
categorizing the stored queries based on the type of query; and
analyzing the categorized queries to determine whether the queries can be answered automatically to the customer.

7. The method of claim 6, wherein categorizing the stored queries comprises:
categorizing the received queries based on various categories selected from the group consisting of product category, mindset of customer, topic, type of customer, and nature of query.

8. The method of claim 7, further comprising:
manually communicating the answers to the customer based on categorization of the queries.

9. The method of claim 1, wherein extracting one or more key-words comprises:
extracting key-words based on specific criteria selected from the group consisting of removing one or more general words from the queries and product FAQs, removing all words including three or fewer letters, and removing one or more rarely used words.

10. The method of claim 9, wherein extracting one or more key-words further comprises:
replacing the extracted key-words with appropriate synonyms; and
stemming the replaced key-words using a Modified Porters Stemming Algorithm.

11. The method of claim 10, wherein stemming the replaced key-words compnses:
applying the Modified Porters Stemming Algorithm to each of the replaced key-words until no more stemming can be performed on the replaced key-words.

12. The method of claim 1, further comprising:
normalizing each of the transformed unique numerical representations.

13. The method of claim 12, wherein normalizing the numerical representations comprises:
normalizing based on minimum/maximum values in the transformed unique numerical representations.

14. The method of claim 13, wherein representing the key-words in the vector forms comprises:
representing the vector forms using the normalized unique numerical representations.

15. The method of claim 1, wherein representing the key-words in the vector forms comprises:
representing a size of the vector forms based on a predetermined number of key-words.

16. The method of claim 15, wherein the predetermined number is in the range of about 10 to 15 key-words.

17. The method of claim 1, wherein applying the convolution algorithm further comprises:
applying a self-convolution algorithm to each of the query vector forms to obtain resultant convoluted representation of the query;
applying the convolution algorithm to the query vector form with each of the product FAQ vector forms to obtain resultant convoluted representation of the FAQ answers; and
comparing the resultant convoluted representation of the query and the FAQ answers to determine appropriate answers to the queries.

18. The method of claim 1, wherein communicating automatically to the customer's queries comprises:
automatically communicating the answers to the customers using communication methods selected from the group consisting of a letter, an e-mail, internet, and a telephone.

19. A computer-implemented system for providing automated customer support for a product, comprising:
a web server to receive one or more queries regarding the product from a customer;
a FAQ extractor coupled to the web server that extracts one or more corresponding answers in product FAQs from respective product FAQ databases;
a key-word extractor coupled to the web server and the FAQ extractor extracts one or more key-words from the received queries and the corresponding extracted product FAQs, wherein the key-word extractor transforms each of the extracted key-words into a unique numerical representation so that the transformed unique numerical representations do not result in multiple similar numerical representations, to avoid ambiguous prediction of meaning from the transformed unique numerical representations; and
an analyzer coupled to the key-word extractor that represents the transformed words into respective query and product FAQ vector forms, wherein the analyzer applies a convolution algorithm to each of the query vector forms, with each of the product FAQ vector forms separately and obtains one or more appropriate answers to the queries, and wherein the analyzer automatically communicates the answers to the queries received from the customer.

20. The system of claim 19, wherein the web server receives the queries from inputs selected from the group consisting of a letter, a telephone, an e-mail and Internet.

21. The system of claim 19, wherein the web server translates the received queries into a text.

22. The system of claim 21, wherein the web server manually enters the text in the received queries through the letter.

23. The system of claim 21, wherein the web server translates the received queries from the telephone into a text using a voice recognition system.

24. The system of claim 21, wherein the web server stores the received queries into a buffer.

25. The system of claim 21, further comprising:
a categorizer coupled to the web server that categorizes the received queries based on a type of query, wherein the analyzer further analyzes the categorized queries to determine whether the answers to the queries can be automatically communicated to the customer.

26. The system of claim 25, wherein the categorizer categorizes the queries based on categories selected from the group consisting of product category, mindset of customer, topic, type of customer, and nature of query.

27. The system of claim 25, wherein the analyzer manually communicates answers to the customer based on the categorized queries.

28. The system of claim 19, wherein the key-word extractor extracts key-words based on specific criteria selected from the group consisting of removing one or more general words from the queries and product FAQs, removing all words including three or fewer letters, and removing one or more rarely used words.

29. The system of claim 28, wherein the key-word extractor replaces the extracted key-words with appropriate synonyms, and further stems the replaced key-words using a Modified Porters Stemming Algorithm.

30. The system of claim 29, wherein the key-word extractor applies the Modified Porters Stemming Algorithm to each of the replaced words until no more stemming can be performed on the replaced key-word.

31. The system of claim 19, wherein the key-word extractor normalizes each of the transformed numerical representations.

32. The system of claim 31, wherein the key-word extractor normalizes based on minimum/maximum values in the transformed unique numerical representations.

33. The system of claim 19, wherein the analyzer forms the query and product FAQ vector form sizes based on a predetermined number of key-words.

34. The system of claim 33, wherein the predetermined number of key-words is in the range of about 10 to 15 key-words.

35. The system of claim 19, wherein the analyzer applies a self-convolution algorithm to each of the query vector forms to obtain resultant convoluted representation of the query, and the analyzer applies the convolution algorithm to the query vector form with each of the product FAQ vector forms to obtain resultant convoluted representation of the FAQ answers, and wherein the analyzer further compares the resultant convoluted representation of the query and the FAQ answers to determine one or more appropriate answers to the queries.

36. The system of claim 19, wherein the analyzer communicates the answers automatically to the customers using communicating methods selected from the group consisting of letters, e-mails, internet and telephones.

* * * * *